United States Patent [19]
Akeley

[11] Patent Number: 5,933,155
[45] Date of Patent: Aug. 3, 1999

[54] SYSTEM AND METHOD FOR BUFFERING MULTIPLE FRAMES WHILE CONTROLLING LATENCY

[75] Inventor: Kurt Barton Akeley, Mountain View, Calif.

[73] Assignee: Silicon Graphics, Inc., Mountain View, Calif.

[21] Appl. No.: 08/743,883

[22] Filed: Nov. 6, 1996

[51] Int. Cl.$^6$ .................................................... G06F 13/00
[52] U.S. Cl. ......................................... 345/508; 345/501
[58] Field of Search .................................. 345/507–509, 345/511, 501

[56] References Cited

U.S. PATENT DOCUMENTS 5,519,825  5/1996  Naughton et al. ....................... 345/473
5,617,118  4/1997  Thompson .............................. 345/508

*Primary Examiner*—Kee M. Tung
*Attorney, Agent, or Firm*—Sterne, Kessler, Goldstein & Fox P.L.L.C.

[57] ABSTRACT

A system and method for managing multiple frame buffers. The system includes multiple frame buffers, and thus reduces the risk of dropped frames. The system controls and bounds render-to-display latency, and provides an application friendly and effective interface to the frame buffers. The system operates by estimating a latency of a frame that is yet to be rendered. The system determines whether the latency is greater than a target latency. If the latency is greater than the target latency, then the system blocks the application that is responsible for rendering the frame before rendering of the frame commences. As a result, render-to-display latency is bounded to the target latency. The system addresses the naming issue by providing the application with access to only the front buffer and the back buffer. In particular, the present system maintains a queue of one or more frame buffers. The newest frame buffer appended to the queue is considered to be the front buffer. The oldest frame buffer in the queue is displayed. A frame buffer not in the queue is considered to be the back buffer. Rendering is enabled to the back buffer. Once rendering to the back buffer is complete, the back buffer is appended to the queue and becomes the new front buffer.

30 Claims, 18 Drawing Sheets

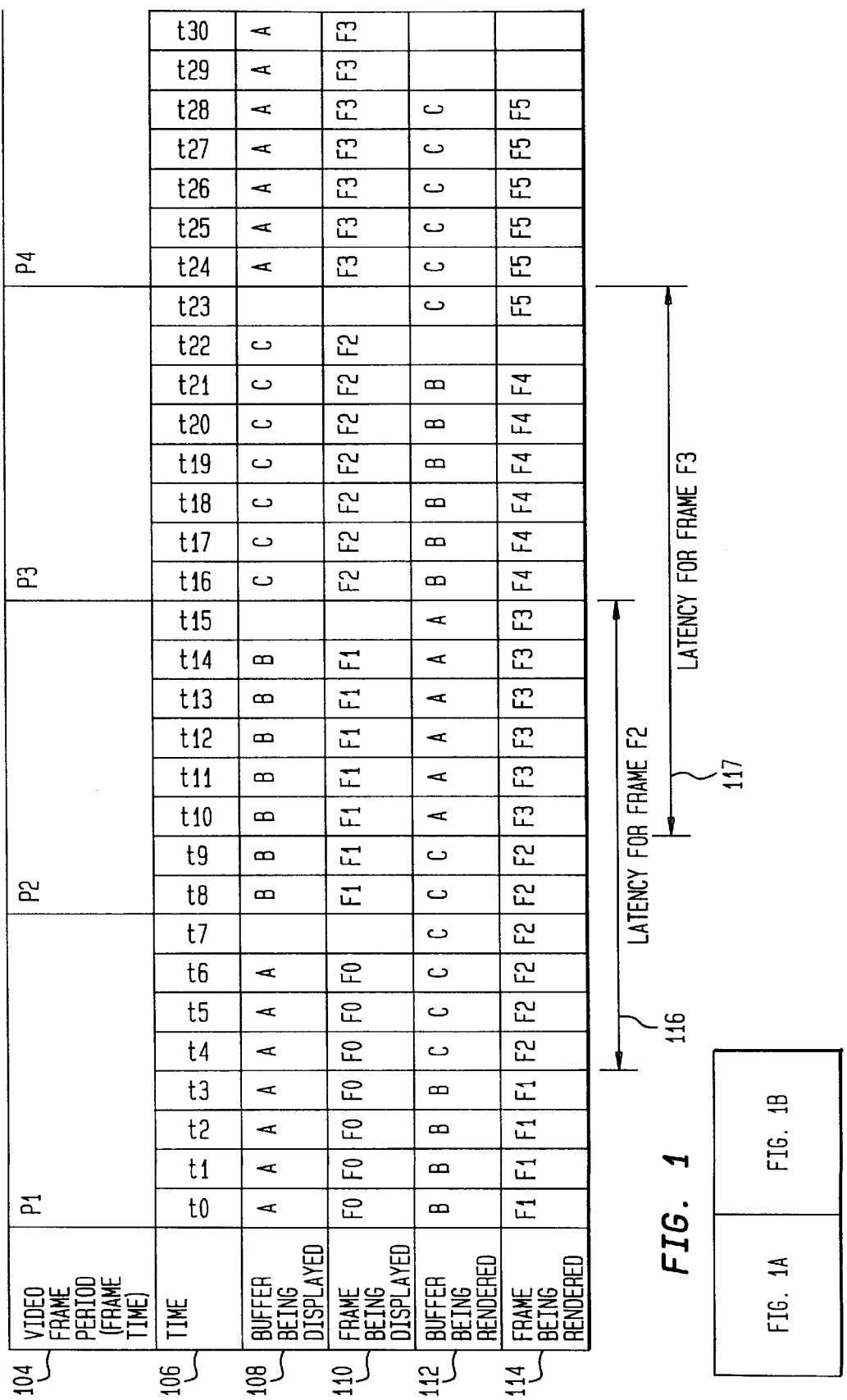

FIG. 1B

| | | | | | |
|---|---|---|---|---|---|
| | t55 | | | A | F9 |
| | t54 | A | F6 | | |
| | t53 | A | F6 | | |
| | t52 | A | F6 | C | F8 |
| | t51 | A | F6 | C | F8 |
| | t50 | A | F6 | C | F8 |
| | t49 | A | F6 | C | F8 |
| P7 | t48 | A | F6 | C | F8 |
| | t47 | | | C | F8 |
| | t46 | C | F5 | | |
| | t45 | C | F5 | | |
| | t44 | C | F5 | B | F7 |
| | t43 | C | F5 | B | F7 |
| | t42 | C | F5 | B | F7 |
| | t41 | C | F5 | B | F7 |
| P6 | t40 | C | F5 | B | F7 |
| | t39 | | | B | F7 |
| | t38 | B | F4 | | |
| | t37 | B | F4 | | |
| | t36 | B | F4 | A | F6 |
| | t35 | B | F4 | A | F6 |
| | t34 | B | F4 | A | F6 |
| | t33 | B | F4 | A | F6 |
| P5 | t32 | B | F4 | A | F6 |
| | t31 | | | A | F6 |

LATENCY FOR FRAME F6

| Video Frame Period | Time | Buffer Being Displayed | Frame Being Displayed | Buffer Being Rendered | Frame Being Rendered | Front Buffer | Back Buffer |
|---|---|---|---|---|---|---|---|
| P1 | t0 | A | F0 | B | F1 | A | B |
| P1 | t1 | A | F0 | B | F1 | A | B |
| P1 | t2 | A | F0 | B | F1 | A | B |
| P1 | t3 | A | F0 | B | F1 | A | B |
| P1 | t4 | A | F0 | B | F1 | A | B |
| P1 | t5 | A | F0 | B | F1 | A | B |
| P1 | t6 | A | F0 | C | F2 | B | C |
| P1 | t7 |   |   | C | F2 | B | C |
| P2 | t8 | B | F1 | C | F2 | B | C |
| P2 | t9 | B | F1 | C | F2 | B | C |
| P2 | t10 | B | F1 | C | F2 | B | C |
| P2 | t11 | B | F1 | C | F2 | B | C |
| P2 | t12 | B | F1 | C | F2 | B | C |
| P2 | t13 | B | F1 | C | F2 | B | C |
| P2 | t14 | B | F1 | A | F3 | C | A |
| P2 | t15 |   |   | A | F3 | C | A |
| P3 | t16 | C | F2 | A | F3 | C | A |
| P3 | t17 | C | F2 | A | F3 | C | A |
| P3 | t18 | C | F2 | A | F3 | C | A |
| P3 | t19 | C | F2 | A | F3 | C | A |
| P3 | t20 | C | F2 | A | F3 | C | A |
| P3 | t21 | C | F2 | A | F3 | C | A |
| P3 | t22 | C | F2 | B | F4 | A | B |
| P3 | t23 |   |   | B | F4 | A | B |
| P4 | t24 | A | F3 | B | F4 | A | B |
| P4 | t25 | A | F3 | B | F4 | A | B |
| P4 | t26 | A | F3 | B | F4 | A | B |
| P4 | t27 | A | F3 | B | F4 | A | B |
| P4 | t28 | A | F3 | B | F4 | A | B |
| P4 | t29 | A | F3 | B | F4 | A | B |
| P4 | t30 | A | F3 | C | F5 | B | C |
| P4 | t31 |   |   | C | F5 | B | C |

STEADY STATE; LATENCY = 1.25

FIG. 10B

| | | | | | | | |
|---|---|---|---|---|---|---|---|
| P7 | t55 | | | C | F8 | B | C |
| | t54 | A | F6 | C | F8 | B | C |
| | t53 | A | F6 | B | F7 | A | B |
| | t52 | A | F6 | B | F7 | A | B |
| | t51 | A | F6 | B | F7 | A | B |
| | t50 | A | F6 | B | F7 | A | B |
| | t49 | A | F6 | B | F7 | A | B |
| | t48 | A | F6 | B | F7 | A | B |
| P6 | t47 | | | B | F7 | A | B |
| | t46 | C | F5 | B | F7 | A | B |
| | t45 | C | F5 | A | F6 | C | A |
| | t44 | C | F5 | A | F6 | C | A |
| | t43 | C | F5 | A | F6 | C | A |
| | t42 | C | F5 | A | F6 | C | A |
| | t41 | C | F5 | A | F6 | C | A |
| | t40 | C | F5 | A | F6 | C | A |
| P5 | t39 | | | A | F6 | C | A |
| | t38 | B | F4 | A | F6 | C | A |
| | t37 | B | F4 | C | F5 | B | C |
| | t36 | B | F4 | C | F5 | B | C |
| | t35 | B | F4 | C | F5 | B | C |
| | t34 | B | F4 | C | F5 | B | C |
| | t33 | B | F4 | C | F5 | B | C |
| | t32 | B | F4 | C | F5 | B | C |

FIG. 11A

| VIDEO FRAME PERIOD (FRAME TIME) | P1 | | | | | | | P2 | | | | | | | P3 | | | | | | | | P4 | | | | | | | |
|---|---|---|---|---|---|---|---|---|---|---|---|---|---|---|---|---|---|---|---|---|---|---|---|---|---|---|---|---|---|---|
| TIME | t0 | t1 | t2 | t3 | t4 | t5 | t6 | t7 | t8 | t9 | t10 | t11 | t12 | t13 | t14 | t15 | t16 | t17 | t18 | t19 | t20 | t21 | t22 | t23 | t24 | t25 | t26 | t27 | t28 | t29 | t30 |
| BUFFER BEING DISPLAYED | A | A | A | A | A | A | A | | B | B | B | B | B | B | B | | C | C | C | C | C | C | C | | A | A | A | A | A | A | A |
| FRAME BEING DISPLAYED | F0 | F0 | F0 | F0 | F0 | F0 | F0 | | F1 | F1 | F1 | F1 | F1 | F1 | F1 | | F2 | F2 | F2 | F2 | F2 | F2 | F2 | | F3 | F3 | F3 | F3 | F3 | F3 | F3 |
| BUFFER BEING RENDERED | B | B | B | | | | C | C | C | C | C | C | | | A | A | A | A | A | | | | B | B | B | B | B | B | | | C |
| FRAME BEING RENDERED | F1 | F1 | F1 | | | | F2 | F2 | F2 | F2 | F2 | F2 | | | F3 | F3 | F3 | F3 | F3 | | | | F4 | F4 | F4 | F4 | F4 | F4 | | | F5 |

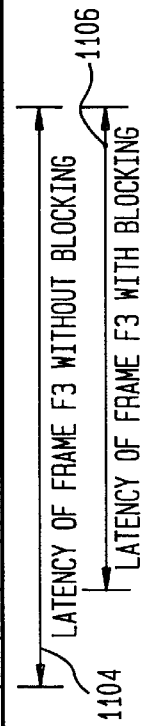

LATENCY OF FRAME F3 WITHOUT BLOCKING — 1106
LATENCY OF FRAME F3 WITH BLOCKING — 1104

FIG. 11

| FIG. 11A |
|---|
| FIG. 11B |

3/4 RENDERING; LATENCY = 1.25

FIG. 11B

| | | | | | |
|---|---|---|---|---|---|
| | t55 | | | C | F8 |
| | t54 | A | F6 | C | F8 |
| | t53 | A | F6 | | |
| | t52 | A | F6 | | |
| | t51 | A | F6 | B | F7 |
| | t50 | A | F6 | B | F7 |
| | t49 | A | F6 | B | F7 |
| P7 | t48 | A | F6 | B | F7 |
| | t47 | | | B | F7 |
| | t46 | C | F5 | B | F7 |
| | t45 | C | F5 | | |
| | t44 | C | F5 | | |
| | t43 | C | F5 | A | F6 |
| | t42 | C | F5 | A | F6 |
| | t41 | C | F5 | A | F6 |
| P6 | t40 | C | F5 | A | F6 |
| | t39 | | | A | F6 |
| | t38 | B | F4 | A | F6 |
| | t37 | B | F4 | | |
| | t36 | B | F4 | | |
| | t35 | B | F4 | C | F5 |
| | t34 | B | F4 | C | F5 |
| | t33 | B | F4 | C | F5 |
| P5 | t32 | B | F4 | C | F5 |
| | t31 | | | C | F5 |

FIG. 12A

| Video Frame Period | Time | Buffer Being Displayed | Frame Being Displayed | Buffer Being Rendered | Frame Being Rendered |
|---|---|---|---|---|---|
| P1 | t0 | A | F0 | B | F1 |
| P1 | t1 | A | F0 | B | F1 |
| P1 | t2 | A | F0 | B | F1 |
| P1 | t3 | A | F0 | B | F1 |
| P1 | t4 | A | F0 | B | F1 |
| P1 | t5 | A | F0 | B | F1 |
| P1 | t6 | A | F0 | C | F2 |
| P2 | t7 |   |   | C | F2 |
| P2 | t8 | B | F1 | C | F2 |
| P2 | t9 | B | F1 | C | F2 |
| P2 | t10 | B | F1 | C | F2 |
| P2 | t11 | B | F1 | C | F2 |
| P2 | t12 | B | F1 | C | F2 |
| P2 | t13 | B | F1 | C | F2 |
| P2 | t14 | B | F1 | A | F3 |
| P3 | t15 |   |   | A | F3 |
| P3 | t16 | C | F2 | A | F3 |
| P3 | t17 | C | F2 | A | F3 |
| P3 | t18 | C | F2 | A | F3 |
| P3 | t19 | C | F2 | A | F3 |
| P3 | t20 | C | F2 | A | F3 |
| P3 | t21 | C | F2 | A | F3 |
| P3 | t22 | C | F2 | A | F3 |
| P4 | t23 |   |   | B | F4 |
| P4 | t24 | A | F3 | B | F4 |
| P4 | t25 | A | F3 | B | F4 |
| P4 | t26 | A | F3 | B | F4 |
| P4 | t27 | A | F3 | B | F4 |
| P4 | t28 | A | F3 | B | F4 |
| P4 | t29 | A | F3 | B | F4 |
| P4 | t30 | A | F3 | B | F4 |

| FIG. 12A | FIG. 12B |
|---|---|

4/4 RENDERING; OVERLOAD; NO RECOVERY

FIG. 12B

| | | | | | |
|---|---|---|---|---|---|
| | t55 | | | B | F7 |
| | t54 | A | F6 | B | F7 |
| | t53 | A | F6 | B | F7 |
| | t52 | A | F6 | B | F7 |
| | t51 | A | F6 | B | F7 |
| | t50 | A | F6 | B | F7 |
| | t49 | A | F6 | B | F7 |
| P7 | t48 | A | F6 | B | F7 |
| | t47 | | | A | F6 |
| | t46 | C | F5 | A | F6 |
| | t45 | C | F5 | A | F6 |
| | t44 | C | F5 | A | F6 |
| | t43 | C | F5 | A | F6 |
| | t42 | C | F5 | A | F6 |
| | t41 | C | F5 | A | F6 |
| P6 | t40 | C | F5 | A | F6 |
| | t39 | | | C | F5 |
| | t38 | B | F4 | C | F5 |
| | t37 | B | F4 | C | F5 |
| | t36 | B | F4 | C | F5 |
| | t35 | B | F4 | C | F5 |
| | t34 | B | F4 | C | F5 |
| | t33 | B | F4 | C | F5 |
| P5 | t32 | B | F4 | C | F5 |
| | t31 | | | B | F4 |

FIG. 13A

| Video Frame Period (Frame Time) | Time | Buffer Being Displayed | Frame Being Displayed | Buffer Being Rendered | Frame Being Rendered |
|---|---|---|---|---|---|
| P1 | t0 | A | F0 | B | F1 |
| P1 | t1 | A | F0 | B | F1 |
| P1 | t2 | A | F0 | B | F1 |
| P1 | t3 | A | F0 | B | F1 |
| P1 | t4 | A | F0 | B | F1 |
| P1 | t5 | A | F0 | B | F1 |
| P1 | t6 | A | F0 | C | F2 |
| P1 | t7 |   |   | C | F2 |
| P2 | t8 | B | F1 | C | F2 |
| P2 | t9 | B | F1 | C | F2 |
| P2 | t10 | B | F1 | C | F2 |
| P2 | t11 | B | F1 | C | F2 |
| P2 | t12 | B | F1 | C | F2 |
| P2 | t13 | B | F1 | C | F2 |
| P2 | t14 | B | F1 | A | F3 |
| P2 | t15 |   |   | A | F3 |
| P3 | t16 | C | F2 | A | F3 |
| P3 | t17 | C | F2 | A | F3 |
| P3 | t18 | C | F2 | A | F3 |
| P3 | t19 | C | F2 | A | F3 |
| P3 | t20 | C | F2 | A | F3 |
| P3 | t21 | C | F2 | A | F3 |
| P3 | t22 | C | F2 | A | F3 |
| P3 | t23 |   |   | B | F4 |
| P4 | t24 | A | F3 | B | F4 |
| P4 | t25 | A | F3 | B | F4 |
| P4 | t26 | A | F3 | B | F4 |
| P4 | t27 | A | F3 | B | F4 |
| P4 | t28 | A | F3 | B | F4 |
| P4 | t29 | A | F3 | B | F4 |
| P4 | t30 | A | F3 | B | F4 |

1302

| FIG. 13A |
|---|
| FIG. 13B |

FIG. 13

FULL RENDERING; OVERLOAD; RECOVERY

FIG. 13B

| | | | | | |
|---|---|---|---|---|---|
| P8 | t57 | B | F7 | C | F8 |
| | t56 | B | F7 | C | F8 |
| P7 | t55 | | | C | F8 |
| | t54 | A | F6 | C | F8 |
| | t53 | A | F6 | B | F7 |
| | t52 | A | F6 | B | F7 |
| | t51 | A | F6 | B | F7 |
| | t50 | A | F6 | B | F7 |
| | t49 | A | F6 | B | F7 |
| | t48 | A | F6 | B | F7 |
| P6 | t47 | | | B | F7 |
| | t46 | C | F5 | B | F7 |
| | t45 | C | F5 | A | F6 |
| | t44 | C | F5 | A | F6 |
| | t43 | C | F5 | A | F6 |
| | t42 | C | F5 | A | F6 |
| | t41 | C | F5 | A | F6 |
| | t40 | C | F5 | A | F6 |
| P5 | t39 | | | A | F6 |
| | t38 | B | F4 | C | F5 |
| | t37 | B | F4 | C | F5 |
| | t36 | B | F4 | C | F5 |
| | t35 | B | F4 | C | F5 |
| | t34 | B | F4 | C | F5 |
| | t33 | B | F4 | C | F5 |
| | t32 | B | F4 | C | F5 |
| | t31 | | | B | F4 |

SYSTEM AND METHOD FOR BUFFERING MULTIPLE FRAMES WHILE CONTROLLING LATENCY

BACKGROUND OF THE INVENTION

1. Field of the Invention

The present invention relates generally to interactive computer graphics, and more particularly to managing multiple frame buffers in an interactive computer graphics system.

2. Related Art

A constant frame-rate, interactive computer graphics application is a computer application that endeavors to generate a new image frame every N video frame periods, where N is typically a small constant integer. A video frame period is equal to the time needed to display an image frame a single time on a computer display. A video frame period includes any overhead associated with the particular computer display being used, such as vertical retrace associated with raster displays. A frame time is equal to N video frame periods. A frame time refers to the amount of time that each image frame is displayed on the computer display.

If a constant frame-rate application is unable to generate a frame within one frame time, then the application is said to have dropped a frame. Dropping a frame detracts from the graphical presentation and interactiveness of the application. Accordingly, constant frame-rate applications make every effort to avoid dropping frames.

In particular, constant frame-rate applications monitor the utilization of graphics resources during the rendering of the current frame in order to predict the behavior of future frames. If such prediction indicates that a future frame may be dropped due to an overload condition, then the rendering complexity of that frame is reduced (e.g., by using models of lower geometric resolution) so as to avoid the overload condition.

Many modern interactive graphics systems utilize a double buffered system that includes two frame buffers. Such systems include those that support OpenGL (GL stands for graphics library), which is a software interface to graphics hardware.

In a double buffered system, the frame (called Frame M) stored in one of the buffers is displayed. This buffer is called the Front Buffer. The other buffer is used to construct (i.e., generate or draw or render) the next frame (called Frame M+1). This buffer is called the Back Buffer. At the conclusion of Frame M's frame time, a Swap command is executed to logically convert the Back Buffer to the Front Buffer. This results in Frame M+1 being displayed.

Since double buffered systems include only two frame buffers, Frame M+1 must be rendered during the frame time that Frame M is displayed. Otherwise, a frame (i.e., Frame M+1) will be dropped.

However, it is impossible to precisely predict the time required to generate a frame. Constant frame-rate applications compensate for this imprecision by underutilizing the rendering hardware in order to insure that frames are not dropped. This is not an ideal solution, however, since it is preferable for resolution purposes to utilize the rendering hardware to the greatest extent possible.

A conventional solution to this problem is to utilize more than two frame buffers. The use of three or more frame buffers enables a constant frame-rate application to take longer than one frame time to generate a frame, without causing a frame to be dropped. This solution has been proposed and implemented in the MBX extension of the X Window System. MBX is an extension of OpenGL. MBX stands for multibuffer extension.

There are two significant drawbacks to conventional multibuffer (greater than two buffer) systems. The first deals with the naming of the frame buffers, or in the larger sense, answering the question of how an application will have access to the buffers. According to MBX, each frame buffer is named. That is, MBX allows each frame buffer to be rendered and displayed in any order, and at any time. Thus, MBX cannot be used effectively without explicit, substantial, and skilled application reprogramming.

The second drawback deals with the potential increase in render-to-display latency that results from the use of multiple frame buffers. Render-to-display latency refers to the time from the moment that rendering of a frame is begun to the time that the frame is displayed. Large render-to-display latency values detract from the interactiveness of a graphics system, and are therefore guarded against with as much zeal as dropped frames are avoided. (Note that one consequence of dropping a frame is increased latency). Double buffered systems inherently limit latency to one frame time. In the absence of artificially imposed constraints, a multibuffer system with greater than two frame buffers could increase render-to-display latency to significantly greater than one frame time.

The increased render-to-display latency associated with a three buffer system (with Buffers A, B, and C) is illustrated in a timing diagram 102 shown in FIGS. 1A and 1B. FIG. 1 illustrates the orientation of FIGS. 1A and 1B. In the example of FIGS. 1A and 1B, a video frame period is equal to a frame time (i.e., N is equal to one). For illustrative purposes, each video frame period or frame time is shown as including eight equal duration time intervals. For example, video frame period P2 runs from time t8 to time t15. It should be understood that such segmentation of video frame periods as shown in FIGS. 1A and 1B is done for illustrative purposes only. In practice, the temporal segmentation of video frame periods is not as neat and clearcut as that shown in FIGS. 1A and 1B.

A Frame Being Displayed row 110 indicates the frame that is being displayed for the corresponding time interval indicated in the Time row 106, and a Buffer Being Displayed row 108 indicates the buffer in which the displayed frame is stored. A Frame Being Rendered row 114 indicates the frame that is being rendered during the corresponding time interval indicated in the Time row 106, and a Buffer Being Rendered row 112 indicates the buffer in which the rendering is taking place.

For purposes of the example shown in FIGS. 1A and 1B, it is assumed that 87.5% of a video frame period (i.e., 7 out of 8 time intervals) is required to display a frame. It is assumed that 12.5% of a video frame period (i.e., 1 out of 8 time intervals) is required for overhead processing required by the particular display unit being used. Thus, frame F0 stored in Buffer A is shown as being displayed during time intervals t0–t6 of video frame period P1. Time interval t7 is used for overhead processing.

It is also assumed that 75% of a video frame period (i.e., 6 out of 8 time intervals) is required to render a frame. Thus, frame F3 is rendered in Buffer A during time intervals t10–t15. Conventional multibuffer systems allow the next frame to be rendered as soon as rendering of the previous frame is complete (assuming that a buffer is available). Thus, during time intervals t0–t21, frames F1, F2, F3, and F4 are rendered immediately one after another. However, frame F5 cannot be rendered in Buffer C until time interval t23, since Buffer C is not available until time interval t23 (note that Buffer C is used for display purposes up to and including time interval t22).

In the three buffer scenario of FIGS. 1A and 1B, render-to-display latency increases over time because: (1) the rendering hardware is not fully utilized (as indicated by the fact that rendering occurs during only 75% of a video frame period); and (2) the rendering of the next frame is allowed to begin immediately after the rendering of the preceding frame. Thus, the latency 116 of frame F2 is equal to 12 time intervals (1.5 video frame periods), whereas the latency 117 of Frame F3 is equal to 14 time intervals (1.75 video frame periods). Latency is ultimately bound by the availability of frame buffers for rendering. In the steady state, the render-to-display latency is equal to 17 time intervals (just over two video frame periods), as illustrated by the latency 118 for frame F6.

Thus, what is required is a multibuffer interactive graphics system having three or more frame buffers, wherein the system does not suffer from the naming problem or the latency problem described above.

SUMMARY OF THE INVENTION

Briefly stated, the present invention is directed to a system and method for managing multiple frame buffers. The invention includes multiple frame buffers, and thus reduces the risk of dropped frames. However, the invention controls and bounds render-to-display latency, and provides an application friendly and effective interface to the frame buffers.

The present invention operates by estimating a latency of a frame that is yet to be rendered. The invention determines whether the latency is greater than a target latency. If the latency is greater than the target latency, then the invention blocks the application that is responsible for rendering the frame before rendering of the frame commences. As a result, render-to-display latency is bounded to the target latency.

The present invention addresses the naming issue by providing the application with access to only the front buffer and the back buffer. In particular, the present invention maintains a queue of one or more frame buffers. The newest frame buffer appended to the queue is considered to be the front buffer. The oldest frame buffer in the queue is displayed. A frame buffer not in the queue is considered to be the back buffer. Rendering is enabled to the back buffer. Once rendering to the back buffer is complete, the back buffer is appended to the queue and becomes the new front buffer.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIGS. 1A and 1B are a timing diagram used to describe a conventional multibuffer system;

FIGS. 10A and 10B, 11A and 11B, 12A and 12B, and 13A and 13B are timing diagrams used to illustrate the operation of the present invention.

DETAILED DESCRIPTION OF THE PREFERRED EMBODIMENTS

Figure 2:
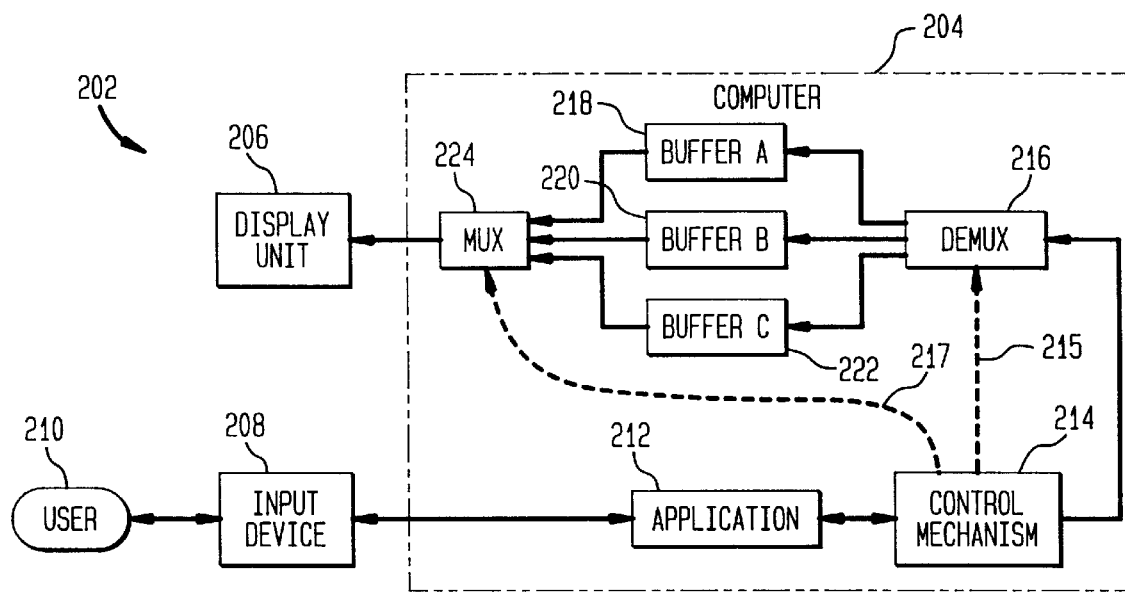
FIG. 2 is a block diagram of a computer graphics system according to a preferred embodiment of the present invention.

Table of Contents 1.0 Overview of the Present Invention
   1.1 Naming Approach
   1.2 Controlling Render-to-Display Latency
2.0 Structure of the Invention
3.0 Operation of the Invention 1.0 Overview of the Present Invention The present invention is directed to an interactive, constant frame-rate graphics computer system. The computer system includes a multibuffer arrangement having three or more frame buffers (alternatively, the computer system could have only two frame buffers). The invention is also directed to a method practiced by the computer system for managing the frame buffers. In accordance with the present invention, such management enables the rendering hardware and/or software to be fully or substantially fully utilized while significantly reducing the chance of dropping a frame.

Such management also controls and reduces render-to-display latency. Such management further provides a user friendly and effective interface between applications and the frame buffers. Thus, the present invention solves the naming and latency problems discussed above. The manner in which the invention addresses and solves the naming and latency problems is discussed in the following two sections.

The present invention is preferably incorporated into systems that support OpenGL or its extensions. OpenGL and its extensions are described in many publicly available documents, such as Neider, Davis, and Woo, *OpenGL Programming Guide*, Addison Wesley, 1995, and OpenGL Architecture Review Board, *OpenGL Reference Manual*, Addison Wesley, 1995, incorporated herein by reference in their entireties. It should be understood, however, that the present invention is not limited to this embodiment. The present invention is adapted and intended to work with other non-OpenGL, interactive computer graphics systems.

1.1 Naming Approach

The present invention addresses the naming problem by hiding the additional buffer(s) within the double buffer naming/access interface. As indicated above, the double buffer interface in the OpenGL API (application programming interface) names the two frame buffers the Front Buffer and the Back Buffer. The Front Buffer is the one that is displayed. The Back Buffer is never displayed, but when the OpenGL Swap command is executed, the current contents of the Back Buffer become the new contents of the Front Buffer, and the contents of the Back Buffer become undefined. ("Swap" refers to one mechanism that can implement this transfer, which is to simply swap the roles of the Front and Back Buffers. But it is equally acceptable for an implementation to copy the contents of the Back Buffer to the Front Buffer).

The present invention maintains a two buffer API, even though three or more buffers exist. In particular, the present invention reveals just a Front Buffer and a Back Buffer to an application, regardless of how many frame buffers actually exist. The Back Buffer is the buffer that is currently being rendered into. It is never displayed. When the Swap command is executed, the Back Buffer is pushed on to a first-in first-out queue of buffers containing frames to be displayed on the display unit. The buffer most recently appended to this queue is defined to be the Front Buffer. The oldest buffer on the FIFO queue is the one being displayed. After it has been displayed for one frame time, this oldest buffer is popped off the FIFO queue, and the next-older buffer begins its display period.

Figure 4:
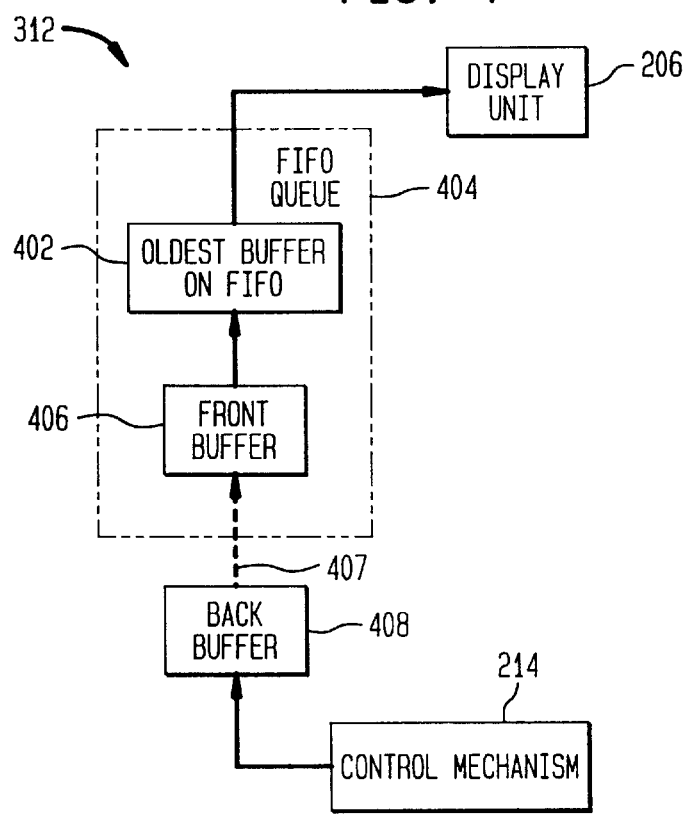
FIG. 4 is a block diagram of a buffer arrangement maintained by the present invention.

This logical arrangement of the frame buffers is illustrated in FIG. 4, which is a three frame buffer example. A frame buffer 408 is being rendered into by a control mechanism 214 (described below). This frame buffer 408 is thus named the Back Buffer. There are two frame buffers 402, 406 in a FIFO queue 404. Frame buffer 406 was most recently appended to the queue 404. Thus, this frame buffer 406 is named the Front Buffer. All other buffers are unnamed. (Once rendering of the frame buffer 408 is complete, frame buffer 408 will be pushed on to the queue 404, as indicated by dashed line 407. At that time, frame buffer 408 will be named the Front Buffer, and the frame buffer 406 will become unnamed). The application has access only to the Front and Back buffers (i.e., only to the unnamed buffers). Frame buffer 408 is the oldest buffer on the queue 404. Thus, this Frame buffer 408 is currently being displayed on the display unit 206.

By maintaining a two buffer API, the invention effectively addresses and solves the naming problem discussed above. Specifically, by maintaining a two buffer API, the present invention achieves the following advantages:

(1) The present invention does not require any new buffer names or access methods.

(2) The multibuffer features and capabilities of the present invention are very easy to incorporate into existing or new applications, since the programming change is slight.

(3) The usage semantics of the frame buffers are completely decoupled from the number of buffers, so the system can allocate or deallocate buffers as desired without having to notify the application.

1.2 Controlling Render-to-Display Latency

The present invention controls render-to-display latency. Such operation of the invention operates to bound render-to-display latency to an application specified maximum latency value, called the Target Latency, irrespective of the number of frame buffers used. The present invention controls render-to-display latency of a frame, called Frame M, by blocking an application from rendering Frame M. Specifically, the present invention blocks the application from rendering Frame M until the gap between the start of rendering and the start of display of Frame M is less than or equal to the Target Latency.

The invention supports at least two blocking modes. In a first mode, the invention blocks the application when it attempts to render Frame M. In other words, the application blocks on render. In a second mode, the invention blocks the application when it attempts to swap after the drawing of Frame M−1 is complete. In other words, the application blocks on swap. In both modes, the application is blocked from rendering Frame M. It should be understood that the invention is adapted and intended to support other blocking modes, such as blocking on other application commands and/or actions. Such blocking modes are implementation specific.

Blocking on render may result in greater sample-to-draw latency than blocking on swap. Consider a typical application control flow:

Step 1: Sample input device (such as a joystick)
Step 2: Calculate viewpoint (based on the sampling of Step 1)
Step 3: Draw scene with respect to viewpoint (render)
Step 4: Swap
Loop to Step 1

Sample-to-draw latency is defined as the time from sampling the input device for the purpose of drawing Frame M (Step 1), to actually drawing Frame M (Step 3). It is preferable to have a small sample-to-draw latency in order to enhance graphical interactivity.

If one blocks on render (Step 3), then there is potentially a large time gap between Steps 2 and 3. Thus, the sample-to-draw latency is higher. In contrast, if one blocks on swap for Frame M−1 (Step 4), then Steps 1, 2, and 3 for Frame M occur one after another, without any delay. Thus, the sample-to-draw latency of Frame M is lower.

The chance of dropping a frame is somewhat higher when blocking on swap, since more non-rendering activities must be performed once the application becomes unblocked. That is, the application must perform Steps 1 and 2, in addition to Step 3, once it becomes unblocked. When blocking on render, the application need only perform Step 3 once it becomes unblocked.

The render-to-display latency for a frame is the same whether blocking on render or blocking on swap. The invention supports both modes, and allows applications to dynamically select the mode that is most advantageous to their respective situations. In another embodiment, applications are not allowed to specify or change the mode. Instead, the mode is preset.

Acceptable render-to-display latency is application specific. Thus, the present invention allows each application to dynamically specify how much latency may be tolerated. In other words, the present invention allows each application to dynamically set the Target Latency for its respective operation. Preferably, the present invention does not allow applications to set the number of frame buffers to be used, or to query the number of buffers that are being used.

The blocking approach of the present invention shall now be further described by reference to the timing diagrams representative of example scenarios shown in FIGS. 10A and 10B, 11A and 11B, 12A and 12B, and 13A and 13B. FIG. 10 illustrates the orientation of FIGS. 10A and 10B. FIG. 11 illustrates the orientation of FIGS. 11A and 11B. FIG. 12 illustrates the orientation of FIGS. 12A and 12B. FIG. 13 illustrates the orientation of FIGS. 13A and 13B.

FIGS. 10A and 10B depict a timing diagram 1002 representative of an example scenario where there are three Frame Buffers A, B, and C. Assume that the application has set the Target Latency to be 1.25 frame times (i.e., 10 time intervals). Also assume that the rendering of a frame takes a full frame time (i.e., 8 time intervals). FIGS. 10A and 10B depict the steady state status of this scenario, with no overload conditions (i.e., with no instances of a frame taking more than a frame time to render).

In the steady state, the rendering of each frame begins 1.25 frame times before the frame is displayed. Thus, in the scenario of FIGS. 10A and 10B, no blocking is required to bound the render-to-display latency to the Target Latency of 1.25 frame times.

The timing diagram 1002 includes a Front Buffer row 1004 that identifies the frame buffer that is considered to be the Front Buffer for the corresponding time interval indicated in the Time row 1008. The timing diagram 1002 also includes a Back Buffer row 1006 that identifies the frame buffer that is considered to be the Back Buffer for the corresponding time interval indicated in the Time row 1008. As discussed above, the Back Buffer is always the buffer that is being rendered into. Thus, for example, during time intervals t6–t13, Buffer C is the Back Buffer since Buffer C is being rendered into during this time span. The Front Buffer is the buffer that was last rendered into (that is, the Front Buffer is the buffer that was the Back Buffer before the Swap command was executed). Thus, Buffer C becomes the Front Buffer at time t14, since rendering of Buffer C is complete at time t13 (assuming that the Swap command is executed at time t13).

FIGS. 11A and 11B are a timing diagram 1102 representative of an example scenario where there are three Frame Buffers A, B, and C. Assume that the application has set the Target Latency to be 1.25 frame times (i.e., 10 time intervals). Also assume that the rendering of a frame takes 75% of a frame time (i.e., 6 time intervals). No overload conditions are shown in FIGS. 11A and 11B.

Consider the rendering of frame F3 in Buffer A. The rendering of frame F2 is complete at time t11. The display of frame F3 in Buffer A will begin at time t24. If rendering of frame F3 in Buffer A begins immediately after the rendering of frame F2 is complete, then the render-to-display latency 1104 of frame F3 will be 1.5 frame times. This is greater than the Target Latency of 1.25 frame times. Thus, the invention blocks the rendering of frame F3 until a time that ensures that frame F3's render-to-display latency will be less than or equal to the Target Latency. In the example scenario of FIGS. 11A and 11B, the invention blocks the rendering of frame F3 until time t14. By doing so, the invention bounds frame F3's render-to-display latency to 1.25 frame times, which is equal to the Target Latency.

It is illustrative to compare FIGS. 11A and 11B with FIGS. 1A and 1B. The scenarios presented in these figures are exactly the same, except blocking is performed in FIGS. 11A and 11B, and no blocking is performed in FIGS. 1A and 1B. As discussed above, without the blocking features of the invention, the render-to-display latency in the scenario of FIGS. 1A and 1B exceeded two frame times. Thus, the present invention through its blocking features controls and bounds render-to-display latency, irrespective of the number of frame buffers used.

FIGS. 12A and 12B are a timing diagram 1202 representative of an example scenario where there are three Frame Buffers A, B, and C. Assume that the application has set the Target Latency to be 1.25 frame times (i.e., 10 time intervals). Also assume that the rendering of a frame takes almost 100% of a frame time (i.e., almost 8 time intervals).

The fact that the rendering takes almost a full frame time is good, because it means that the rendering hardware is being fully utilized. The slight underutilization is important, however, because it leads to the creation of a time "cushion" between the rendering of a frame and the display of the frame. For example, there is a two time interval cushion (represented by times t6 and t7) between the rendering and display of frame F1 in Buffer B. In practice, utilization of the rendering hardware/software is much greater than that shown in FIGS. 12A and 12B.

The cushion is very valuable when overload conditions occur. An overload condition is represented by both frames F3 and F4, which both take 1.125 frame times to render (i.e., 9 time intervals). However, this overload is absorbed by the cushion, such that no frames are dropped. Note, however, that the cushion is eliminated by the completion of the rendering of frame F4 (time t31). The cushion is recovered over time as a natural consequence of the slight underutilization of the rendering hardware/software. Alternatively, the cushion is more quickly recovered by rendering subsequent frames at a lower utilization of the rendering hardware/software. FIGS. 12A and 12B do not show the recovery of the cushion.

Instead, the recovery of the cushion is shown in FIGS. 13A and 13B. In FIGS. 13A and 13B (as in FIGS. 12A and 12B), the cushion is eliminated by the completion of the rendering of frame F4 (time t31). In the scenario of FIGS. 13A and 13B, however, the rendering of frames F5 and F6 is conducted at a lower utilization of the rendering hardware/software, such that the rendering of frames F5 and F6 each takes only 87.5% of a frame time (i.e., 7 time intervals). The cushion of two time intervals is restored by the completion of the rendering of frame F6.

In some embodiments, the applications sense the cushion, and adjust rendering complexity so as to maintain the cushion at acceptable levels. In other embodiments, this duty is performed by an entity that is somehow involved in the rendering process, such as the operating system, rendering hardware drivers, higher-level software between the application and the rendering hardware, etc. In other embodiments, this duty is automatically performed by the invention. In particular, the invention modulates the rendering complexity so as to maintain an acceptable cushion. This latter embodiment is described below. However, it should be understood that the operation described below can also be performed by any other entity involved in the rendering process. It should also be understood that different and multiple system entities can be used to manage rendering to frame buffers, and to manage the cushion.

2.0 Structure of the Invention

FIG. 2 is a block diagram of a computer graphics system 202. The system 202 includes a computer 204 that is connected to a display unit 206 and an input device 208. A user 210 interacts with the computer 204 via the display unit 206 and the input device 208. The display unit 206 is described herein as being a raster type monitor, but it should be understood that the invention is adapted and intended to operate with any type of display units based on any display technology. The input device 208 is any type of computer input device, especially those that are adapted for use with computer graphics applications, such as a keyboard, mouse, joystick, steering wheel, pistol, rifle, keypad, etc.

One or more applications, such as application 212, execute in the computer 204. The application 212 is preferably an interactive, constant frame-rate computer graphics application. The application 212 receives user input via the input device 208. The application 212 sends commands, such as render and swap commands, to a control mechanism 214. In response to render commands from the application 212, the control mechanism 214 renders to a plurality of frame buffers. In the embodiment of FIG. 2, the computer 204 includes three frame buffers, Buffers A, B, and C. However, the computer 204 can have any number of buffers (preferably, the computer 204 has three or more buffers). The Buffers A, B, and C are preferably color buffers.

A demultiplexer 216 distributes the rendering commands from the control mechanism 214 to the Buffers A, B, and C in accordance with signals 215 from the control mechanism 214. Specifically, the control mechanism 214 renders into the buffer that is, at the time, considered to be the Back Buffer. As discussed below, the control mechanism 214 keeps track of which Buffer A, B, or C is the Back Buffer. Thus, when rendering, the control mechanism 214 sends an appropriate signal 215 to the demultiplexer 216 to cause the demultiplexer 216 to route the rendering commands to the Buffer A, B, or C that is currently considered to be the Back Buffer.

A multiplexer 224 selectively connects one of the Buffers A, B, or C to the display unit 206 so as to display the contents of this buffer on the display unit 206. The oldest buffer on the FIFO queue 404 (FIG. 4) is displayed on the display unit 206. As discussed below, the control mechanism 214 stores the arrangement and status of the FIFO queue 404. Thus, the control mechanism 214 sends an appropriate signal 217 to the multiplexer 224 to cause the multiplexer 224 to connect the oldest buffer on the FIFO queue 404 to the display unit 206.

Figure 3:
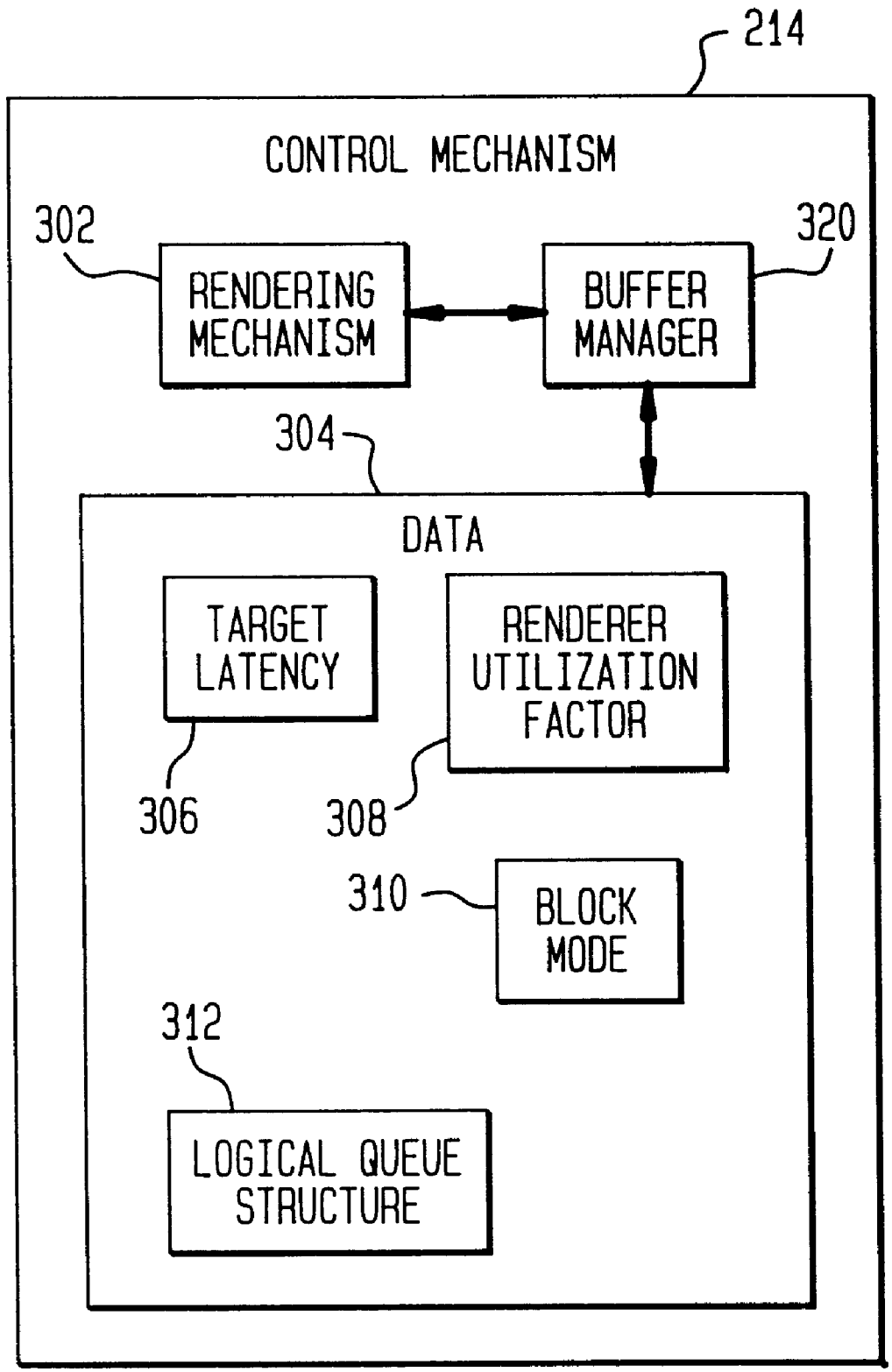
FIG. 3 is a block diagram of a control mechanism according to a preferred embodiment of the present invention.

FIG. 3 is a block diagram of the control mechanism 214. The control mechanism 214 includes a rendering mechanism 302. The rendering mechanism 302 is any combination of well known hardware and/or software computer graphics drawing and rendering tools.

A buffer manager 320 manages Buffers A, B, and C. Specifically, the buffer manager 320 controls rendering and display of Buffers A, B, and C. The buffer manager 320 also controls blocking of the application 212 to minimize render-to-display latency.

The control mechanism 214 stores various data elements 304. The buffer manager 320 refers to these data elements 304 to perform its function. The data elements 304 include a Target Latency 306, which is application supplied and which is the maximum acceptable render-to-display latency. The control mechanism 214 manages Buffers A, B, C (where such management includes blocking the application 212) so as to bound the render-to-display latency to the Target Latency 306.

A Renderer Utilization Factor 308 is preferably a percentage value indicating the extent to which the capabilities of the rendering mechanism 302 will be utilized to render frames. If the Renderer Utilization Factor 308 is set to 100%, for example, then the rendering complexity of the rendering mechanism 302 is set to its highest level so as to achieve the highest geometric resolution possible (it is assumed that the maximum value of the Renderer Utilization Factor 308 is 100%). If the Renderer Utilization Factor 308 is set to a value less than 100%, then the rendering complexity of the rendering mechanism 302 is reduced. Preferably, the Renderer Utilization Factor 308 is set such that rendering of a frame takes slightly less than a frame time (i.e., the Renderer Utilization Factor 308 is slightly less than 100%).

A Block Mode 310 indicates whether the buffer manager 320 will block on render or block on swap.

A Logical Queue Structure 312 includes information identifying the frame buffers that are considered to be the Front and Back Buffers. The Logical Queue Structure 312 also includes information that identifies the buffers in the FIFO Queue 404, and the ordering of the buffers in the FIFO Queue 404.

Figure 14:
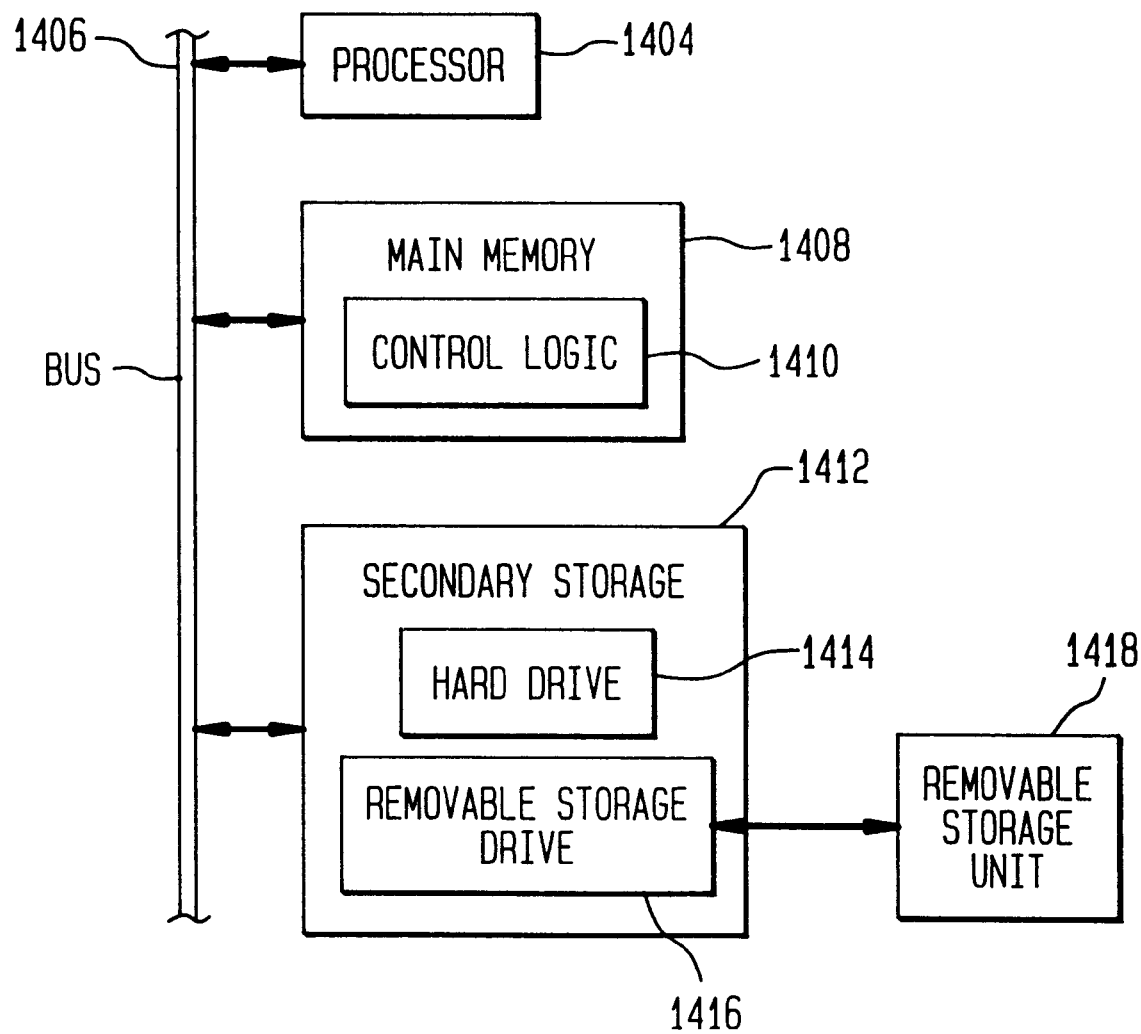
FIG. 14 is a block diagram of a computer used to implement components of the invention.

The computer 204 is preferably implemented as shown in FIG. 14. The computer 204 includes one or more processors, such as processor 1404. The processor 1404 is connected to a communication bus 1406.

The computer 204 also includes a main memory 1408, preferably random access memory (RAM). Control logic 1410, such as the application 212 and the control mechanism 214, are stored in the main memory 1408.

Secondary storage 1412 includes, for example, a hard disk drive 1414 and/or a removable storage drive 1416, representing a floppy disk drive, a magnetic tape drive, a compact disk drive, etc. The removable storage drive 1416 reads from and/or writes to a removable storage unit 1418 in a well known manner.

Removable storage unit 1418, also called a program storage device or a computer program product, represents a floppy disk, magnetic tape, compact disk, etc. As will be appreciated, the removable storage unit 1418 includes a computer usable storage medium having stored therein computer software and/or data.

As indicated above, control logic 1410, representing computer programs, are stored in main memory 1408 and/or the secondary storage 1412. Such computer programs, when executed, enable the computer 204 to perform the features of the present invention as discussed herein. In particular, the computer programs, when executed, enable the processor 1404 to perform the features of the present invention. Accordingly, such computer programs represent controllers of the computer 204.

In one embodiment, the invention is directed to a computer program product comprising a computer readable medium having control logic (computer software) stored therein. The control logic, when executed by the processor 204, causes the processor 204 to perform the functions of the invention as described herein.

3.0 Operation of the Invention

The operation of the present invention shall now be described with reference to operational flowcharts shown in FIGS. 5–9.

Figure 5:
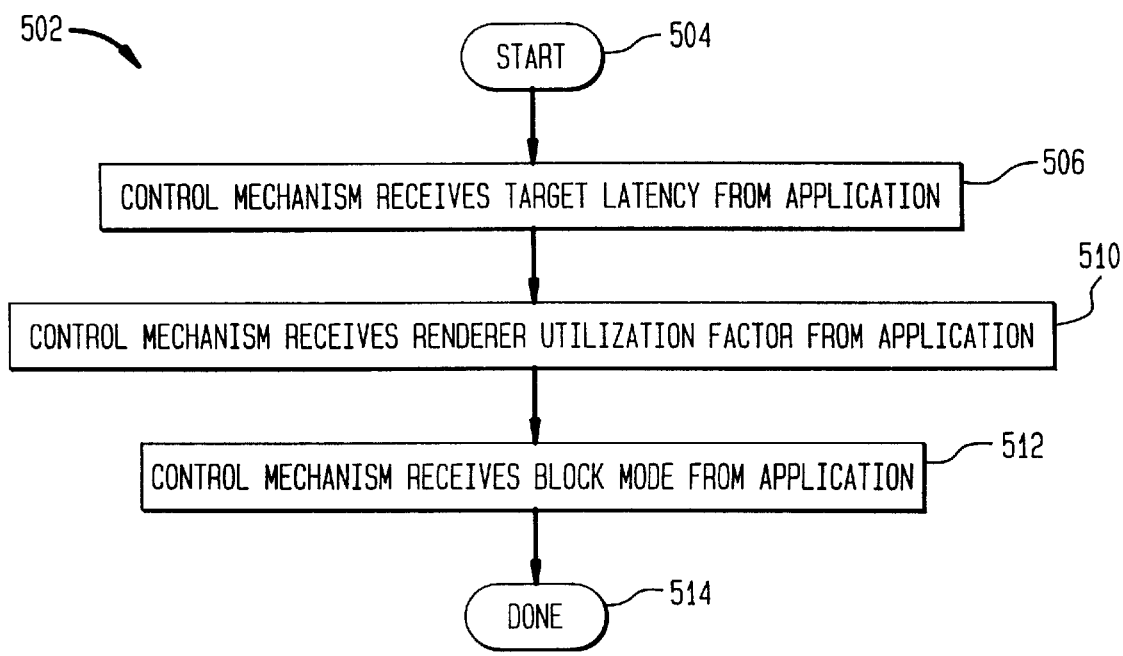
FIGS. 5, 6, 7, 8, and 9 are flowcharts depicting the preferred operation of the present invention.

FIG. 5 is a flowchart 502 representing the interaction between the control mechanism 214 and the application 212 during an initialization phase. During this initialization phase, the application 212 sets the Target Latency 306 (step 506) and the Block Mode 310 (step 512). Preferably, the application 212 can modify these values at any time.

In some embodiments, the application 212 also sets the Renderer Utilization Factor 308 (step 510). In other embodiments, the Renderer Utilization Factor 308 is set to a default value, which is preferably slightly less than 100% (such than rendering of a frame takes slightly less that one frame time to complete).

Figure 6:
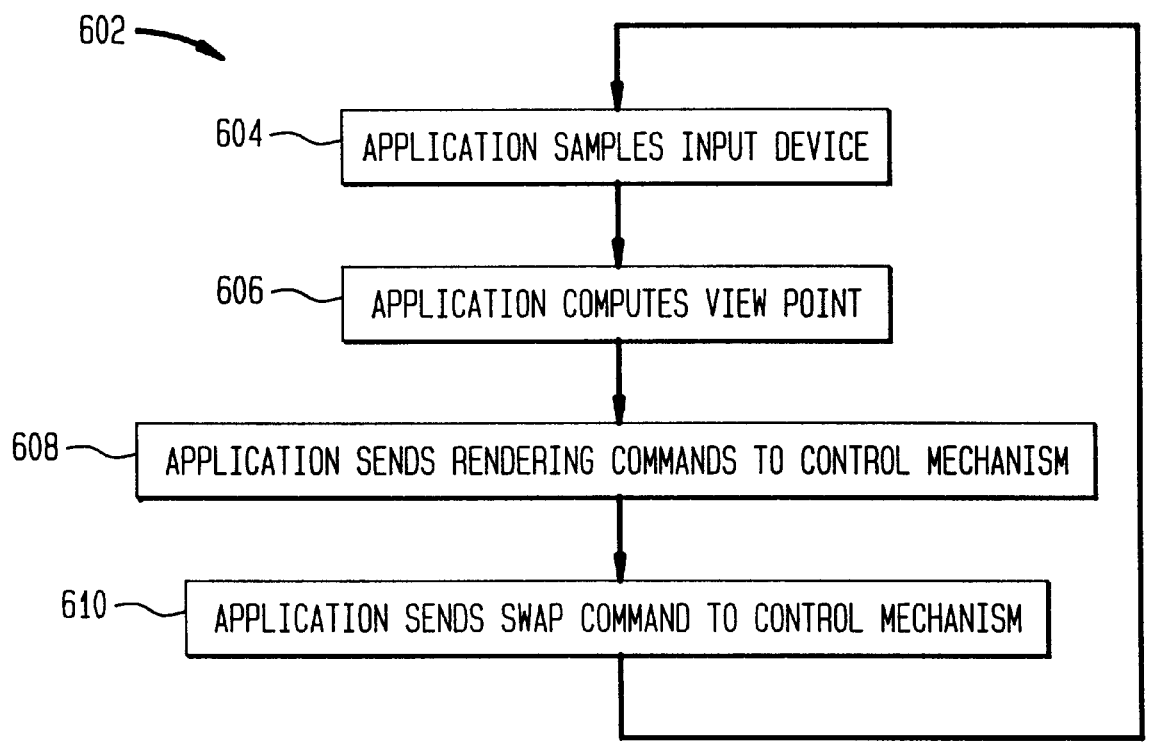

FIG. 6 is a flowchart 602 representing the general operation of the application 212. In step 604, the application 212 samples the input device 208. In step 606, the application 212 computes the view point based on the sample of the input device 208. In step 608, the application 212 sends rendering commands to the control mechanism 214 in order to draw a frame from the perspective of the view point. In step 610, after the frame has been rendered, the application 212 sends a swap command to the control mechanism 214. Control then flows back to step 604.

Figure 7:
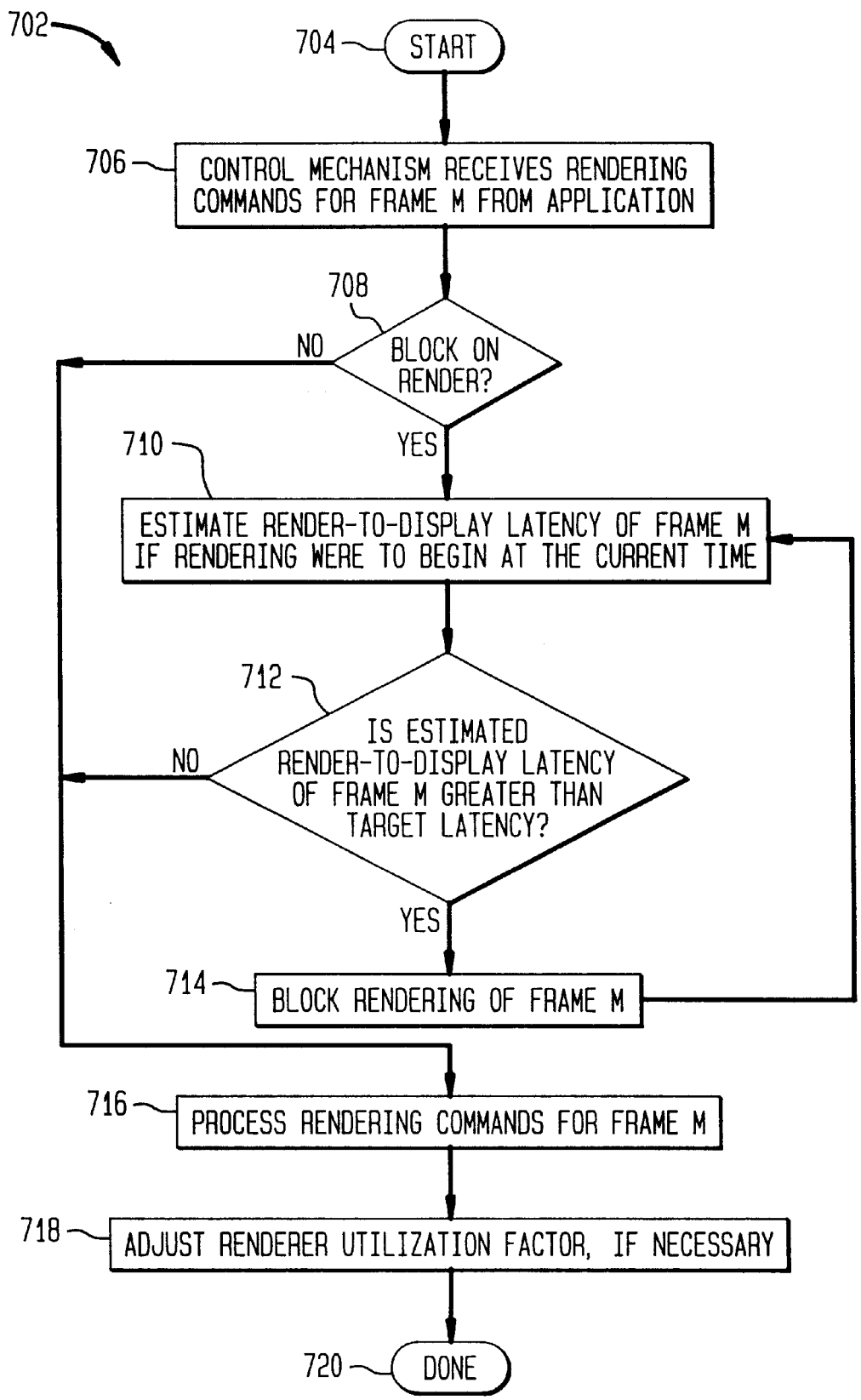

FIG. 7 is a flowchart 702 representing the manner in which the control mechanism 214 processes the rendering commands received from the application 212. In step 706, the control mechanism 214 receives one or more rendering commands from the application 212. These rendering commands are for Frame M, which is a new frame that is being rendered to the Back Buffer.

In step 708, the buffer manager 320 refers to the Block Mode 310 to determine whether it is to block on render. If the Block Mode 310 indicates that it is to block on swap (instead of render), then control flows to step 716 (described below). If, instead, the Block Mode 310 indicates that it is to block on render, then step 710 is performed.

In step 710, the buffer manager 320 estimates the render-to-display latency of Frame M if rendering of Frame M were to begin immediately. The render-to-display latency of Frame M is estimated to be the combined remaining display time of the frames in the FIFO Queue 404. Specifically, the estimated render-to-display latency is estimated as follows:

Estimated render-to-display latency=(remaining Frame Time of buffer being displayed)+((number of buffers in the queue)−1)*Frame Time      Equation 1

Consider, for example, the scenario presented in FIGS. 11A and 11B. Assume that it is now time t12, and the control mechanism 214 has just received a rendering command to begin rendering frame F3 in Buffer A (Buffer A is the Back Buffer). There are two buffers in the Queue 404, Buffer B (which is being displayed) and Buffer C (the Front Buffer). At time t12, the remaining Frame Time of Buffer B is 4 time intervals (t12 through t15). This includes monitor overhead. Thus, at time t12, the estimated render-to-display latency of frame F3 is:

Estimated render-to-display latency=4+(2−1)*8=12 time intervals      Equation 2

In step 712, the buffer manager 320 determines whether the estimated render-to-display latency is greater than the Target Latency 306. If the estimated render-to-display latency is not greater than the Target Latency 306, then no blocking is required. Step 716 is performed, which is described below. If, instead, the estimated render-to-display latency is greater than the Target Latency 306, then blocking is required. Thus, step 714 is performed. In the example of FIGS. 11A and 11B, the Target Latency 306 is equal to 10 time intervals. The estimated latency is greater than this amount. Thus, the buffer manager 320 would perform step 714.

In step 714, the buffer manager 320 blocks the application 212 for the current time interval. The buffer manager 320 performs such blocking by not beginning to process the rendering command(s) received in step 706 during the current time interval. Control then flows back to step 710.

If, in step 708, the Block Mode 310 indicated blocking on swap, or if, in step 712, the estimated render-to-display latency was not greater than the Target Latency 306, then step 716 is performed. In step 716, the control mechanism 214 in combination with the rendering mechanism 302 begin to process the rendering command(s) for Frame M.

In step 718, after rendering of Frame M is complete, the control mechanism 214 adjusts the Renderer Utilization Factor 308 (if necessary) to compensate for any prior overload conditions. Step 718 is optionally performed by the control mechanism 214. In some embodiments, the functionality of step 718 is alternatively performed by another system entity (as described above).

Flowchart 702 is complete after step 718 is performed, as indicated by step 720.

Figure 8:
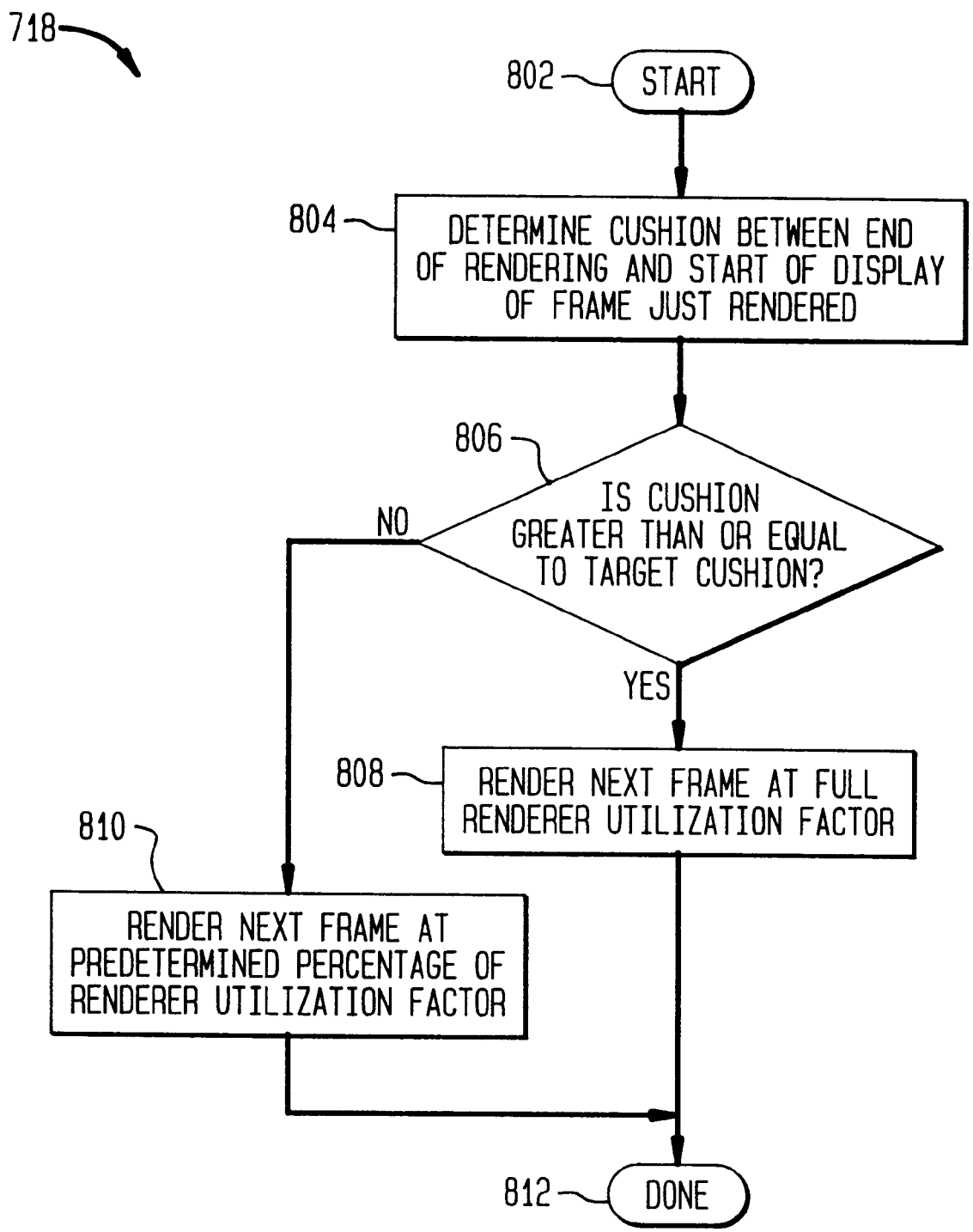

The manner in which the buffer manager 320 (or other system entity) adjusts the Renderer Utilization Factor 308 in step 718 shall now be described with reference to a flowchart shown in FIG. 8. In step 804, the buffer manager 320 calculates the time difference (i.e., the cushion) between the end of rendering and the start of display of the frame just rendered. Consider the example scenario in FIGS. 13A and 13B. The end of rendering of frame F3, for example, occurs at time t22. The start of display of frame F3 occurs at time t24. Thus, there is a one time interval (time t23) cushion between the end of rendering of frame F3 and the start of display of frame F3.

In step 806, the buffer manager 320 determines whether the cushion determined in step 804 is greater than or equal to a Target Cushion. The Target Cushion is derivable from the Target Latency 306. In one embodiment, the Target Cushion is equal to the Target Latency 306 minus the frame time (where both are expressed in terms of time intervals). Referring to the example of FIGS. 11A and 11B, the Target Latency 306 is equal to 10 time intervals and the frame time is equal to 8 time intervals. Thus, the Target Cushion is equal to 2 time intervals. In another embodiment, the Target Cushion is equal to the Target Latency 306 minus the Renderer Utilization Factor 308 (where both are expressed in terms of time intervals). Referring again to the example of FIGS. 11A and 11B, the Target Latency 306 is equal to 10 time intervals and the Renderer Utilization Factor 308 is equal to 6 time intervals. Thus, the Target Cushion is equal to 4 time intervals.

If the cushion is greater than or equal to the Target Cushion 314, then the buffer manager 320 determines in step 808 that it should render the next frame at the full Renderer Utilization Factor 308. If, instead, the cushion is less than the Target Cushion 314, then the buffer manager 320 determines in step 810 that it should render the next frame at a predetermined percentage of the Renderer Utilization Factor 308. For example, the buffer manager 320 may render the next frame at 100% of the Renderer Utilization Factor 308 (in this case, the operation of steps 808 and 810 is the same). This will result in the recovery of the cushion over time, since the Renderer Utilization Factor 308 is preferably slightly less than a full frame time. Alternatively, the buffer manager 320 renders the next frame at less than the full Renderer Utilization Factor 308, such as 95% of the Rendering Utilization Factor 308. This will result in recovering the cushion faster at the expense of graphical quality. Operation of the flowchart in FIG. 8 is complete after the performance of step 808 or 810, as indicated by step 812.

The operation of the flowchart in FIG. 8 shall now be further illustrated by reference to the example scenario in FIGS. 13A and 13B. Assume that the Target Cushion is equal to two time intervals. After rendering frame F3, the buffer manager 320 in step 804 determines that the cushion is 1 time interval (time t23). Thus, the buffer manager 320 in step 810 decides to render the next frame F4 at a percentage of the Renderer Utilization Factor 810. However, frame F4 is such that its rendering still takes 1.125 frame times. After rendering of frame F4, the buffer manager 320 determines in step 804 that the cushion is completely extinguished. Thus, the buffer manager 320 in step 810 decides to render the next frame F5 at a percentage of the Renderer Utilization Factor 810. As a result, frame F5 only takes 87.5% of a frame time to render. After the rendering of frame F5, the buffer manager 320 determines in step 804 that the cushion is back to 1 time interval. This is still less than the Target Cushion. Thus, the buffer manager 320 in step 810 decides to render the next frame F6 at a percentage of the Renderer Utilization Factor 810. As a result, frame F6 only takes 87.5% of a frame time to render. After the rendering of frame F6, the buffer manager 320 determines in step 804 that the cushion is back to 2 time intervals, which is equal to the Target Cushion. Thus, the buffer manager 320 in step 808 decides to render the next frame F7 at the full Renderer Utilization Factor 308.

Figure 9:
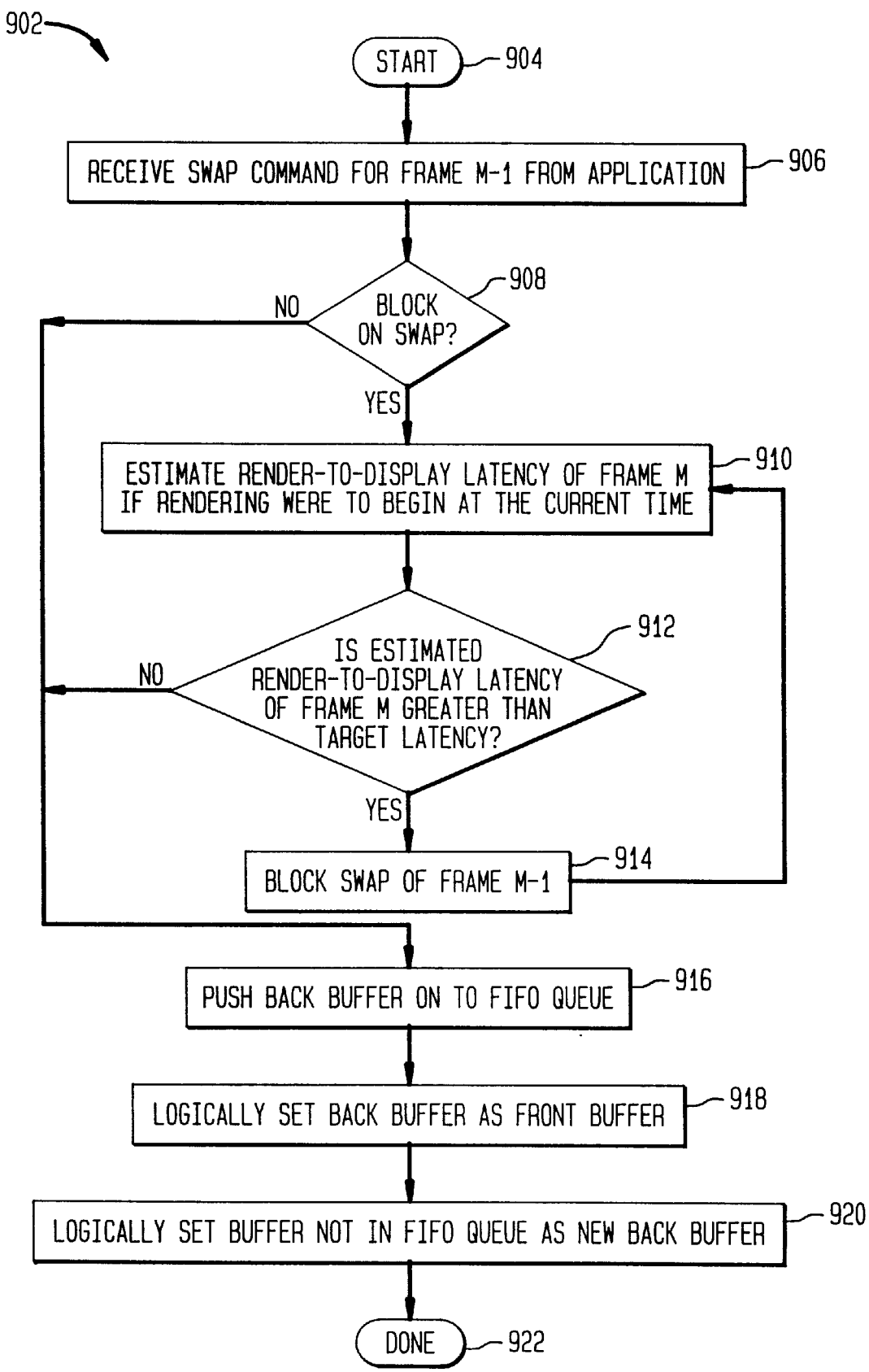

FIG. 9 is a flowchart 902 representing the manner in which the control mechanism 214 processes the swap command received from the application 212. In step 906, the control mechanism 214 receives the swap command from the application 212. This swap command is for a Frame M-1 just rendered in the Back Buffer.

In step 908, the buffer manager 320 refers to the Block Mode 310 to determine whether it is to block on swap. If the Block Mode 310 indicates that it is to block on render (instead of swap), then control flows to step 916 (described below). If, instead, the Block Mode 310 indicates that it is to block on swap, then step 910 is performed.

In step 910, the buffer manager 320 estimates the render-to-display latency of Frame M if rendering of Frame M were to begin immediately. The render-to-display latency of Frame M is estimated to be the combined remaining display time of the frames in the FIFO Queue 404, as described above (see Equation 1).

In step 912, the buffer manager 320 determines whether the estimated render-to-display latency is greater than the Target Latency 306. If the estimated render-to-display latency is not greater than the Target Latency 306, then no blocking is required. Step 916 is performed, which is described below. If, instead, the estimated render-to-display latency is greater than the Target Latency 306, then blocking is required. Thus, step 914 is performed.

In step 914, the buffer manager 320 blocks the application 212 for the current time interval. The buffer manager 320 performs such blocking by not processing the swap command during the current time interval. Control then flows back to step 910.

If, in step 908, the Block Mode 310 indicated blocking on render, or if, in step 912, the estimated render-to-display latency was not greater than the Target Latency 306, then step 916 is performed. In step 916, the control mechanism 214 begins to process the swap command. In particular, the buffer manager 320 pushes the Back Buffer on to the FIFO queue 404 (step 916), and logically sets the Back Buffer as the new Front Buffer (step 918). Then, the buffer manager 320 sets a buffer not contained in the queue 404 as the new Back Buffer (step 920). Processing of flowchart 902 is complete after step 920 is performed, as indicated by step 922.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of managing multiple frame buffers, comprising the steps of:

(1) estimating a latency of a frame that is yet to be rendered to a frame buffer;

(2) determining whether said latency is greater than a target latency; and (3) if said latency is greater than said target latency, then blocking an application responsible for rendering said frame before said frame is rendered into said frame buffer.

2. The method of claim 1, wherein said latency is render-to-display latency, and wherein step (1) comprises the step of:

estimating said latency as a sum of (a) a remaining frame time of a frame buffer in a queue being displayed, and (b) frame times of any frame buffers in said queue waiting to be displayed.

3. The method of claim 1, further comprising the step of:

enabling an application to modify said target latency.

4. The method of claim 1, wherein step (3) comprises the step of:

if said latency is greater than said target latency, then blocking on rendering commands issued by said application.

5. The method of claim 1, wherein step (3) comprises the step of:

if said latency is greater than said target latency, then blocking on a swap command issued by said application.

6. The method of claim 1, further comprising the steps of:

calculating a time differential between end of rendering of said frame and start of displaying of said frame; and if said time differential is less than a target cushion, then rendering a next frame using less graphical complexity.

7. The method of claim 1, further comprising the step of:

(4) if said latency is less than or equal to said target latency, then commencing rendering of said frame into said frame buffer.

8. A system of managing multiple frame buffers, comprising:

latency estimating means for estimating a latency of a frame that is yet to be rendered to a frame buffer;

determining means for determining whether said latency is greater than a target latency; and blocking means for blocking an application responsible for rendering said frame before said frame is rendered into said frame buffer if said latency is greater than said target latency.

9. The system of claim 8, wherein said latency is render-to-display latency, and wherein said latency estimating means estimates said latency as a sum of (a) a remaining frame time of a frame buffer in a queue being displayed, and (b) frame times of any frame buffers in said queue waiting to be displayed.

10. The system of claim 8, further comprising:

means for enabling an application to modify said target latency.

11. The system of claim 8, wherein said blocking means comprises:

means for blocking on rendering commands issued by said application if said latency is greater than said target latency.

12. The system of claim 8, wherein said blocking means comprises:

means for blocking on a swap command issued by said application if said latency is greater than said target latency.

13. The system of claim 8, further comprising:

means for calculating a time differential between end of rendering of said frame and start of displaying of said frame; and means for rendering a next frame using less graphical complexity if said time differential is less than a target cushion.

14. The system of claim 8, further comprising:

means for commencing rendering of said frame into said frame buffer if said latency is less than or equal to said target latency.

15. A method of managing multiple frame buffers, comprising the steps of:

(1) blocking an application responsible for rendering a frame before the frame is rendered if a latency of the frame is greater than a target latency; and (2) enabling the application to render the frame once the latency of the frame is less than the target latency.

16. The method of claim 15, wherein the latency is render-to-display latency that is equal to a sum of (a) a remaining frame time of a frame buffer in a queue being displayed, and (b) frame times of any frame buffers in the queue waiting to be displayed.

17. The method of claim 15, wherein step (1) comprises the step of:

blocking on rendering commands issued by the application if the latency of the frame is greater than the target latency.

18. The method of claim 15, wherein step (1) comprises the step of:

blocking on a swap command issued by the application if the latency of the frame is greater than the target latency.

19. A system for managing multiple frame buffers, comprising:

blocking means for blocking an application responsible for rendering a frame before the frame is rendered if a latency of the frame is greater than a target latency; and means for enabling the application to render the frame once the latency of the frame is less than the target latency.

20. The system of claim 19, wherein the latency is render-to-display latency that is equal to a sum of (a) a remaining frame time of a frame buffer in a queue being displayed, and (b) frame times of any frame buffers in the queue waiting to be displayed.

21. The system of claim 19, wherein said blocking means comprises:

means for blocking on rendering commands issued by the application if the latency of the frame is greater than the target latency.

22. The system of claim 19, wherein said blocking means comprises:

means for blocking on a swap command issued by the application if the latency of the frame is greater than the target latency.

23. A method of rendering frames, comprising the steps of:

(1) maintaining a queue of one or more frame buffers;

(2) naming a newest frame buffer appended to said queue to be a front buffer;

(3) causing an oldest frame buffer in said queue to be displayed;

(4) naming a frame buffer not in said queue to be a back buffer;

(5) blocking an application responsible for rendering a frame before the frame is rendered if a latency of the frame is greater than a target latency; and (6) enabling the application to render the frame into the back buffer once the latency of the frame is less than the target latency.

24. The method of claim 23, wherein step (5) comprises the step of:

blocking on rendering commands issued by the application if the latency of the frame is greater than the target latency.

25. The method of claim 23, wherein step (5) comprises the step of:

blocking on a swap command issued by the application if the latency of the frame is greater than the target latency.

26. The method of claim 23, further comprising the steps of:

appending the back buffer into the queue after rendering of the frame into the back buffer is complete;

unnaming the front buffer; and renaming the back buffer as a new front buffer.

27. A system for rendering frames, comprising:

means for maintaining a queue of one or more frame buffers;

means for naming a newest frame buffer appended to said queue to be a front buffer;

means for causing an oldest frame buffer in said queue to be displayed;

means for naming a frame buffer not in said queue to be a back buffer;

blocking means for blocking an application responsible for rendering a frame before the frame is rendered if a latency of the frame is greater than a target latency; and means for enabling the application to render the frame into the back buffer once the latency of the frame is less than the target latency.

28. The system of claim 17, wherein said blocking means comprises:

means for blocking on rendering commands issued by the application if the latency of the frame is greater than the target latency.

29. The system of claim 17, wherein said blocking means comprises:

means for blocking on a swap command issued by the application if the latency of the frame is greater than the target latency.

30. The system of claim 17, further comprising:

means for appending the back buffer into the queue after rendering of the frame into the back buffer is complete;

means for unnaming the front buffer; and means for renaming the back buffer as a new front buffer.

* * * * *